(12) United States Patent
Wang et al.

(10) Patent No.: US 12,516,343 B1
(45) Date of Patent: Jan. 6, 2026

(54) WHEAT RECEPTOR-LIKE PROTEIN KINASE TAMLR1 AND USE THEREOF

(71) Applicant: Northwest A&F University, Xianyang (CN)

(72) Inventors: Xiaojie Wang, Xianyang (CN); Chunlei Tang, Xianyang (CN); Jianfeng Wang, Xianyang (CN); Zhensheng Kang, Xianyang (CN); Pengfei Gan, Xianyang (CN); Ning Wang, Xianyang (CN)

(73) Assignee: NORTHWEST A&F UNIVERSITY, Xianyang (CN)

( * ) Notice: Subject to any disclaimer, the term of this patent is extended or adjusted under 35 U.S.C. 154(b) by 2 days.

(21) Appl. No.: 19/050,958

(22) Filed: Feb. 11, 2025

(51) Int. Cl.
*C12N 15/82* (2006.01)
(52) U.S. Cl.
CPC ...... *C12N 15/8282* (2013.01); *C12N 15/8205* (2013.01)

(58) Field of Classification Search
None
See application file for complete search history.

(56) References Cited

U.S. PATENT DOCUMENTS

2015/0225736 A1\* 8/2015 Walia ..................... A23K 10/00
800/298

FOREIGN PATENT DOCUMENTS

CN 114317484 A \* 4/2022

OTHER PUBLICATIONS

Xie et al (review. FERONIA Receptor Kinase Integrates with Hormone Signaling to Regulate Plant Growth, Development, and Responses to Environmental Stimuli. Int. J. Mol. Sci. 23, p. 1-16, 2022) (Year: 2022).\*
PacBio (Sequencing 101: understanding accuracy in DNA sequencing. p. 1-4, 2020) (Year: 2020).\*
Wang et al (Fusarium graminearum rapid alkalinization factor peptide negatively regulates plant immunity and cell growth via the FERONIA receptor kinase. Plant Biotechnology Journal, p. 1800-1811, 2024) (Year: 2024).\*
Guo et al (FERONIA Receptor Kinase Contributes to Plant Immunity by Suppressing Jasmonic Acid Signaling in Arabidopsis thaliana. Current Biology 28, 3316-3324, Oct. 22, 2018). (Year: 2018).\*
CN114317484_Translation (2022) (Year: 2022).\*

\* cited by examiner

*Primary Examiner* — Wayne Zhong
(74) *Attorney, Agent, or Firm* — MH2 Technology Law Group, LLP

(57) ABSTRACT

This disclosure belongs to the technical field of bioengineering, and relates to a wheat receptor-like protein kinase TaMLR1 and use thereof. The wheat receptor-like protein kinase TaMLR1 provided by this application has the amino acid sequence of SEQ ID NO: 1, and the open reading frame (ORF) sequence encoding the wheat receptor-like protein kinase TaMLR1 is set forth in SEQ ID NO: 2. In this disclosure, gene editing is conducted in a wild-type material Fielder to obtain a TaMLR1-edited mutant plant exhibiting resistance to *Puccinia striiformis* f. sp. *tritici*, *Blumeria graminis* f. sp. *tritici*, and *Gibberella zeae*. This disclosure offers new technical approach for disease-resistant variety breeding, and confirms the negative regulatory role of the gene in wheat disease resistance, providing a new genetic resource for broad-spectrum disease-resistant breeding of wheat.

3 Claims, 2 Drawing Sheets
Specification includes a Sequence Listing.

```
Fielder     - - - - - - - - - -  - - - - - - - - - -  - - GAG - CGGAGGAATCGGTAGAC - - - - - - - - - -
TaFER-NKO   CAAATGGATGTCATCGTCCGGAGTCGGAGGAATCGGTAGACCAACGTACACT
                     10           20           30           40           50
```

FIG. 4

WHEAT RECEPTOR-LIKE PROTEIN KINASE TAMLR1 AND USE THEREOF

REFERENCE TO SEQUENCE LISTING

A computer readable XML file entitled "GWP20241208067_seqlist", that was created on Jan. 10, 2025, with a file size of about 16,805 bytes, contains the sequence listing for this application, has been filed with this application, and is hereby incorporated by reference in its entirety.

TECHNICAL FIELD

The present disclosure belongs to the technical field of bioengineering, and relates to a wheat receptor-like protein kinase TaMLR1 and use thereof.

BACKGROUND

Wheat (*Triticum aestivum*) is one of the most widely planted and highest-yielding cereal crops in the world, supporting 30-45% of the world's population according to statistics. However, wheat production is severely threatened by three major fungal diseases: wheat stripe rust, powdery mildew and fusarium head blight (FHB), which occur in almost all major wheat regions of the world. Specially, wheat stripe rust is caused by *Puccinia striiformis* f. sp. *tritici*; powdery mildew is caused by *Blumeria graminis* f. sp. *tritici*; and FHB is caused by *Fusarium* spp. The virulence of these pathogens varies frequently, resulting in frequent outbreaks of these diseases and gradually overcoming of resistance in existing varieties. Therefore, the rational use of resistance genes to create disease-resistant materials is the most economical and effective sustainable development strategy for the control of stripe rust, powdery mildew and FHB.

Receptor-like protein kinases (RLKs) are a large group of transmembrane proteins in plants that play a key role in cell-cell and cell-environment communication. RLKs are a group of single-pass transmembrane proteins located on the cell membrane, consisting of an extracellular receptor domain that senses external signals, a transmembrane domain, and an intracellular kinase domain. In the common RLK signaling pathway, the extracellular receptor domain first senses and recognizes the extracellular signals, transmitting the signal to one side of the cytoplasm. The cytoplasmic kinase domain interacts with the downstream proteins and initiates biochemical reactions (such as phosphorylation). Finally, the signal is transmitted to the nucleus through the nucleocytoplasmic shuttling messenger, regulating the expression of downstream genes for signal output, so as to adapt to the rapid changes of the environment.

At present, chemical control is the primary method for managing stripe rust, powdery mildew and FHB of wheat are dominated by, but the hazards to the environment and food safety caused by the use of chemical pesticides have raised widespread concern. Breeding for disease resistance is one of the most economical and effective measures to control these diseases. However, the long excavation cycle of resistance genes, the difficulty in breeding disease-resistant varieties, and the rapid virulence variation of pathogens make it difficult to achieve long-term control of these diseases. Editing susceptible genes is a new approach for plants to acquire disease resistance in the context of disease-resistant breeding.

SUMMARY

An objective of the embodiments of the present disclosure is to solve the problem of reproductive isolation and cross-incompatibility in conventional breeding for disease resistance, making it difficult to achieve directional improvement of target traits in a shorter cultivation period; meanwhile, rapid virulence variation of *Puccinia striiformis* f. sp. *tritici* results in a plurality of difficulties in the persistent control of wheat stripe rust under the current technical conditions.

Based on the above objective, the present disclosure provides a wheat receptor-like protein kinase TaMLR1 and use thereof to meet this need in the art. The embodiments of the present disclosure aim to further explore the innate immune defense mechanism of wheat, and to excavate susceptible genes of the wheat invaded by pathogens such as *Puccinia striiformis* f. sp. *tritici*, *Blumeria graminis* f. sp. *tritici*, and *Gibberella zeae*. Through functional research, embodiments of the present disclosure seek to provide a new path for using the susceptible gene to create wheat disease-resistant materials for the control of wheat stripe rust.

In an aspect, the present disclosure relates to a wheat receptor-like protein kinase TaMLR1. The wheat receptor-like protein kinase TaMLR1 has the amino acid sequence of SEQ ID NO: 1. The open reading frame (ORF) sequence encoding the wheat receptor-like protein kinase TaMLR1 is set forth in SEQ ID NO: 2.

In another aspect, the present disclosure relates to use of the wheat receptor-like protein kinase TaMLR1 in breeding a disease-resistant wheat variety.

In some embodiments, in the use provided by the present disclosure, the ORF sequence encoding the wheat receptor-like protein is expressed by *Agrobacterium*-mediated genetic transformation and experiences negative regulation in the interaction between wheat and *Puccinia striiformis* f. sp. *tritici*, and editing of the wheat receptor-like protein kinase TaMLR1 is capable of enhancing resistance of the wheat to stripe rust, powdery mildew, and FHB.

In still another aspect, the present disclosure relates to a method for breeding a disease-resistant wheat variety, including the step of expressing a wheat receptor-like protein kinase TaMLR1 in a plant or transforming the ORF sequence encoding the wheat receptor-like protein kinase TaMLR1 into the plant.

In some embodiments, the method for breeding a disease-resistant wheat variety provided by the present disclosure includes the step of: transforming the ORF sequence encoding the wheat receptor-like protein kinase TaMLR1 into a cell of the plant to obtain a plant variety with genetically edited wheat receptor-like protein kinase TaMLR1.

In some embodiments, the method for breeding a disease-resistant wheat variety provided by the present disclosure includes the steps of: constructing an editing vector containing the ORF sequence encoding the wheat receptor-like protein kinase TaMLR1; and transforming an immature embryo of the plant using an *Agrobacterium*-mediated genetic transformation method to obtain a plant variety with genetically edited wheat receptor-like protein kinase TaMLR1.

In some embodiments, in the method for breeding a disease-resistant wheat variety provided by the present disclosure, the plant is a monocotyledon, the monocotyledon is a cereal crop, and the cereal crop is wheat.

In some embodiments, in the method for breeding a disease-resistant wheat variety provided by the present disclosure, a line of the wheat includes Fielder.

Compared with the prior art, embodiments of the present disclosure have the following beneficial effects or advantages:

(1) Compared with conventional technology of breeding for disease resistance, genetic engineering technique for plant disease resistance may break through interspecific reproductive isolation and cross-incompatibility, and enable directional improvement of target traits in a relatively short period of time, providing more comprehensive, lasting and broad-spectrum protection for crops. The present disclosure has found through gene function research that the wheat receptor-like protein kinase TaMLR1 play a negative role in the regulation of defense response to *Puccinia striiformis* f. sp. *tritici*, *Blumeria graminis* f. sp. *tritici*, and *Gibberella zeae*. It is shown that gene editing of the wheat receptor-like protein kinase TaMLR1 may significantly enhance the resistance of the wheat to these pathogens, providing a new idea for breeding broad-spectrum disease-resistant materials.

(2) The present disclosure provides a method for breeding a broad-spectrum disease-resistant wheat variety. This method involves gene editing technology to knock out the wheat receptor-like protein kinase TaMLR1 in wheat plants to enhance wheat resistance to *Puccinia striiformis* f. sp. *tritici*, *Blumeria graminis* f. sp. *tritici*, and *Gibberella zeae*. It has been validated that the transgenic wheat obtained by the method of the present disclosure exhibits resistance to the major prevalent microspecies of *Puccinia striiformis* f. sp. *tritici*. The present disclosure provides a new technical idea for breeding a disease-resistant wheat variety from the perspective of molecular biology, and effectively solves the technical problems of the present disclosure.

BRIEF DESCRIPTION OF THE DRAWINGS

FIG. 4 schematically illustrates detection results of TaMLR1 gene editing. In Fielder and TaMLR1 gene-edited material, the sequences of TaMLR1 gene (SEQ ID NOS: 3-4) is amplified by PCR, followed by sequencing and alignments.

DETAILED DESCRIPTION OF THE EMBODIMENTS

The technical solutions of the present disclosure will be described in detail below in conjunction with examples, but the present disclosure is not limited thereto.

To enable a person skilled in the art to better understand technical solutions of the present disclosure, the present disclosure will be further described below in detail with reference to the specific examples and accompanying drawings, but the examples cited are not intended to limit the present disclosure.

The experimental and detection methods described in the following examples are conventional methods, unless otherwise specified; and the reagents and materials can be commercially available, unless otherwise specified.

Example

The example of the present disclosure provided use of a wheat receptor-like protein kinase TaMLR1 in developing a rust-resistant wheat variety.

Using the plant gene editing technology, the wheat receptor-like protein kinase TaMLR1 gene was transformed into wheat cells to obtain a wheat variety with gene-edited TaMLR1.

The use of wheat receptor-like protein kinase TaMLR1 in breeding and improving disease-resistant wheat varieties provided by the example of the present disclosure further included the following steps. An editing vector containing the wheat receptor-like protein kinase TaMLR1 gene was constructed; and immature embryos of wheat were transformed by *Agrobacterium*-mediated genetic transformation method to obtain TaMLR1 gene-edited wheat.

Figure 1:
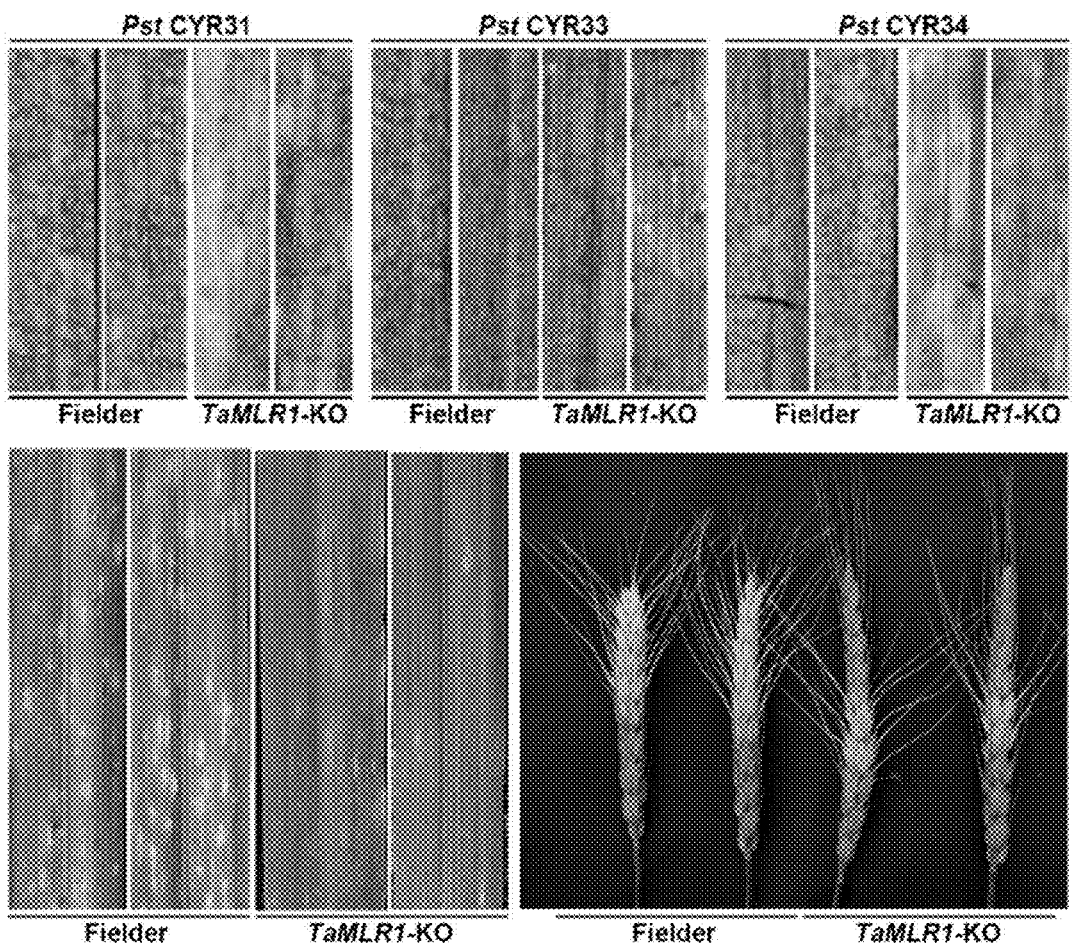
FIG. 1 schematically illustrates the phenotypic results of wheat with genetically edited wheat receptor-like protein kinase TaMLR1 following inoculation with *Puccinia striiformis* f. sp. *tritici*, *Blumeria graminis* f. sp. *tritici*, and *Gibberella zeae*. The morbidity is observed in TaMLR1 gene-edited wheat (TaMR1-KO) inoculated with *Puccinia striiformis* f. sp. *tritici*, *Blumeria graminis* f. sp. *tritici*, and *Gibberella zeae*. TaMLR1-KO is TaMLR1 gene-edited wheat, Fielder is a wild-type wheat variety, and CYR31, CYR33, and CYR34 are *Puccinia striiformis* f. sp. *tritici* strains that exhibit compatible interactions with Fielder.
Figure 2:
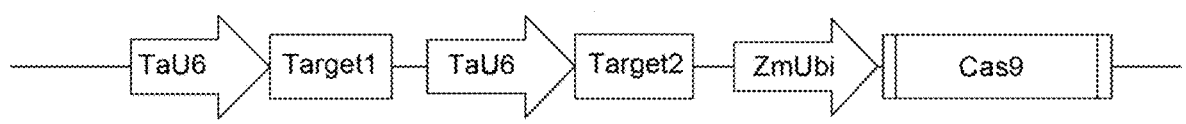
FIG. 2 illustrates the gene-editing vector for the wheat receptor-like protein kinase TaMLR1, where Target1 and Target2 are two sgRNA target sites of the TaMLR1 gene; TaU6 is a promoter that drives the expression of Target1 and Target2; Cas9 is a core element of the gene editing system that encodes Cas9 protein; and zmUbi is a corn ubiquitin promoter that initiates Cas9 expression.
Figure 3:
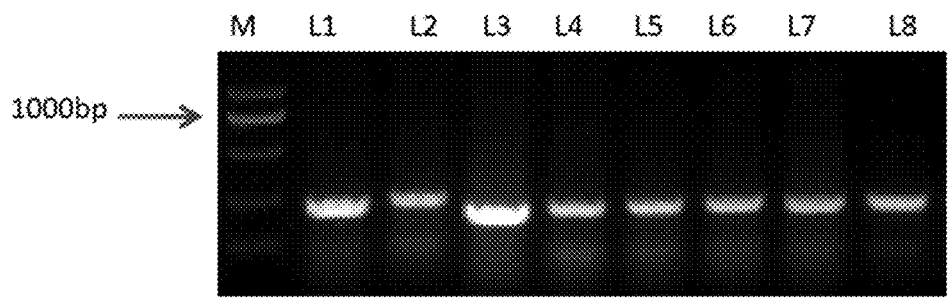
FIG. 3 schematically illustrates polymerase chain reaction (PCR) results of TaMLR1 gene-edited wheat. Transgenic-positive plants were detected by Blp-F/R primers, and PCR products were detected by 1% agarose gel electrophoresis. M: DNA Marker; L1-8: different TaMLR1 gene-edited lines.

As shown in FIG. 1, the method for verifying the use of wheat receptor-like protein kinase TaMLR1 in breeding and improving a broad-spectrum disease-resistant wheat variety provided by the example of the present disclosure was performed as follows.

Step S101, the TaMLR1 gene-edited wheat was obtained, and the resulting TaMLR1 gene-edited wheat was subjected to molecular detection.

Step S102, T1 progeny gene-edited plants were inoculated with *Puccinia striiformis* f. sp. *tritici*, *Blumeria graminis* f. sp. *tritici*, and *Gibberella zeae* to identify the resistance of gene-edited plants.

The functional identification method provided by the example of the present disclosure was as follows.

The gene TaMLR1 was edited by CRISPR/Cas9 gene editing technology, and the phenotype of the gene-edited plant was observed 14 days after inoculation with *Puccinia striiformis* f. sp. *tritici* race CYR23, followed by disease resistance identification.

In the present disclosure, the wheat receptor-like protein kinase TaMLR1 is encoded by the ORF sequence of SEQ ID NO: 2.

In the present disclosure, the wheat receptor-like protein kinase TaMLR1 has the amino acid sequence of SEQ ID NO: 1.

In the present disclosure, the plant is preferably a monocotyledon, which is a customized cereal crop capable of being successfully infected by *Puccinia striiformis* f. sp. *tritici*, and more preferably wheat.

The use of the wheat receptor-like protein kinase TaMLR1 provided by the example of the present disclosure in improving a disease-resistant wheat variety was implemented as follows.

Inoculation of the acquired TaMLR1 gene-edited plant with affinity strain CYR31 resulted in a significant reduction in disease resistance of wheat, indicating a negative regulation of TaMLR1 in the interaction between wheat and *Puccinia striiformis* f. sp. *tritici*, *Blumeria graminis* f. sp. *tritici*, and *Gibberella zeae*.

TaMLR1 gene-edited plants were created by the *Agrobacterium*-mediated genetic transformation method. The gene-edited plants were inoculated with *Puccinia striiformis* f. sp. *tritici, Blumeria graminis* f. sp. *tritici*, and *Gibberella zeae*. Phenotypic identification revealed that TaMLR1 gene-edited plants exhibited enhanced resistance to *Puccinia striiformis* f. sp. *tritici, Blumeria graminis* f. sp. *tritici*, and *Gibberella zeae*.

Provided are primers for amplifying the cDNA:
TaMLR1-cDNA-F: ATGGTGCTCCCAACCTTACCG (SEQ ID NO: 5); and
TaMLR1-cDNA-R: AAATGTATGTCTACCTTTCACTC (SEQ ID NO: 6).

The example of the present disclosure provided the use of the wheat receptor-like protein kinase TaMLR1 in improving a disease-resistant wheat variety.

The designed Primers for gene editing targets were as follows:
Target1:
TaMLR1-Target1-F: ACTCGAGCGGAGGAATCGGTAGAC (SEQ ID NO: 7); and
TaMLR1-Target1-R: AAACGTCTACCGATTCCTCCGCTC (SEQ ID NO: 8).
Target2:
TaMLR1-Target2-F: ACTCGTATACGAATTTATGCCCCG (SEQ ID NO: 9); and
TaMLR1-Target2-R: AAACCGGGGCATAAATTCGTATAC (SEQ ID NO: 10).

Primers for detecting transgenic-positive plants were as follows:
Blp-F: GCAAGACCCTTCCTCTATATAAGG (SEQ ID NO: 11); and
Blp-R: TCAGATCTCGGTGACGGGCAGGACC (SEQ ID NO: 12).

In the use of the wheat receptor-like protein kinase TaMLR1 in improving a disease-resistant wheat variety provided by the example of the present disclosure, the gene editing vector of TaMLR1 gene was constructed by using gene editing technology; the gene editing vector was transformed into the receptor wheat Fielder by *Agrobacterium*-mediated wheat genetic transformation technology. The transformed plants obtained were subjected to PCR, detection of positive plants, and gene editing type detection. It was found that a single base was inserted into the mutant TaMLR1-KO. T1 L1, L2 and L3 lines were selected to be inoculated with *Puccinia striiformis* f. sp. *tritici, Blumeria graminis* f. sp. *tritici*, and *Gibberella zeae*. It was shown that the TaMLR1 gene-edited plants exhibited enhanced resistance compared with Fielder.

The above description demonstrates effective implementation of the present disclosure. The above examples are only intended to describe the preferred embodiments of the present disclosure, but not to limit the scope of the present disclosure. Various alterations and improvements made by those of ordinary skill in the art based on the technical solution of the present disclosure without departing from the design spirit of the present disclosure shall fall within the scope of the appended claims of the present disclosure.

What is claimed is:

1. A method for breeding a disease-resistant wheat variety, comprising:

transforming an editing vector that targets an open reading frame (ORF) sequence encoding the wheat receptor-like protein kinase TaMLR1 into a wheat plant to knock out the wheat receptor-like protein kinase TaMLR1, wherein:

the wheat receptor-like protein kinase TaMLR1 has the amino acid sequence of SEQ ID NO: 1;

the ORF sequence encoding the wheat receptor-like protein kinase TaMLR1 is set forth in SEQ ID NO: 2; and the editing vector comprises sgRNA target sequences of the ORF sequence encoding the wheat receptor-like protein kinase TaMLR1, wherein the sgRNA target sequences comprise:

the forward primer of SEQ ID NO: 7 and the reverse primer of SEQ ID NO: 8, and the forward primer of SEQ ID NO: 9 and the reverse primer of SEQ ID NO: 10.

2. The method for breeding a disease-resistant wheat variety according to claim 1, wherein the transforming comprises:

constructing the editing vector that targets the ORF sequence encoding the wheat receptor-like protein kinase TaMLR1; and transforming the editing vector into an immature embryo of the wheat plant using an *Agrobacterium*-mediated genetic transformation method to obtain a wheat variety with the knocked-out wheat receptor-like protein kinase TaMLR1.

3. The method for breeding a disease-resistant wheat variety according to claim 1, wherein the knockout of the wheat receptor-like protein kinase TaMLR1 is capable of enhancing resistance of the wheat to stripe rust, powdery mildew, and fusarium head blight (FHB).

* * * * *

SEQUENCE LISTING

```
Sequence total quantity: 12
SEQ ID NO: 1            moltype = AA  length = 840
FEATURE                 Location/Qualifiers
source                  1..840
                        mol_type = protein
                        note = wheat receptor-like protein kinase TaMLR1
                        organism = Triticum aestivum
SEQUENCE: 1
MVLPTLPVTL TFLTLLALLS IAKATDNNST TSGLILLNCG SSTQNDDDSG RTWDGDTGSK   60
FAPSMKGVAA IALGQTPSLT PRVPYTTARI FTSNYTYSFP VSPGRMFLRL YFFSTAYEYY  120
AVSDAVFGVT SRNLVLLNDF NALQTAQAIT SAYLVREFSV NVSSGSLDLT FAPSAQQYGS  180
YAFVNGIEIV PTPDIFATPD IRLVSGDNTS PFTFDADMSL QTMYRLNVGG PAISTEGDSG  240
FYRSWANDAQ YILGGSGLTF WKNDNSTISY TSRVPNYTAP VDVYGTARSM GPTAQINLNY  300
NLTWIFPVDA GFFYLLRFHF CEIKYPITKV NQRSFFIYIN NQTTQKQMDV IVRSGGIGRP  360
TYTEYVIMAI GSRQVDMWIA LHPDLSSKPQ YSDAILNGLE VFKLQNYGPS NLAGLSPPLP  420
QKPDVNPTRL SNGERKSKGG IQAIIGGTTG GFALLLIALF SMCVIYRRKK VAKSPGKTDY  480
GHVKHPTKCI KSTCDLVRHF SFAKIQVATK DFDEALIIGR GGFGNVYIGD IDGGTKVAIK  540
RCDQKSQQGF HEFQTEIEML CNFRHRHLVS LIGYCEEKNE MILVYDYMAH GTLREHLYNT  600
RNPPLPWQQR LEICIGAAQG LHYLHTGVEQ GIIHRDVKTT NILLDDRLMA KVSDFGLSKA  660
SPDIGNTHMS TAVKGTFGYL DPEYFRLQRL TKKSDVYSFG VVLFETLCAR PVINTELPYE  720
QVSLRDWALS CWKNGVLEEI VDPRVKEEIT PECFRVFAEI AEKCVADRSI ERPSMGDVLW  780
NLEVALQLQQ ASASYNSNRA EGASSLQISA VHSDEPSTNS TISIAAQEAI FSDIAHPEGR  840

SEQ ID NO: 2            moltype = DNA  length = 2523
FEATURE                 Location/Qualifiers
source                  1..2523
                        mol_type = other DNA
                        note = open reading frame of TaMLR1
                        organism = synthetic construct
SEQUENCE: 2
atggtgctcc caaccttacc ggttaccctc acattcctca cactgctagc tctcttgtcg    60
attgccaagg cgactgataa caactccaca acctctggcc ttatcctcct aaattgcgga   120
tcatcaaccc aaaacgatga tgatagtggt cgtacttggg atggggacac cggctccaaa   180
ttcgcgccat caatgaaagg agttgcagcc attgctttag gccaaacccc ttcactcacc   240
cccagggttc cttatacaac tgcacgcatc tttacttcaa attaccctta ttccttccct   300
gtcagtccag gccgaatgtt cttacgccta tacttctttt caactgctta cgaatactat   360
gctgtctcag atgccgtctt cggagtcacg tcacggaatc ttgtcctctt aaatgacttc   420
aatgctttgc aaacagctca ggcgatcact tctgcctacc ttgtgcgtga attctcggtg   480
aatgtttctt caggcagctt ggacctcacc tttgcaccat cagcacaaca gtatgggtct   540
tatgcatttg tgaatggcat tgagattgtg cccacgcctg acatcttcgc aacacctgac   600
ataagattag tcagcggtga taacacatct ccattcacat tcgatgctga catgagcctc   660
```

-continued

```
cagactatgt accggctcaa tgtcgggggc ccagccattt ccacggaagg tgactcgggc    720
ttttaccgct catgggccaa tgatgcccaa tacatacttg gtggctctgg gttgaccttt    780
tggaaaaatg ataattcgac tatcagttat acatctagag tgccgaatta caccgcccca    840
gttgatgtct atggtacagc tcggtcgatg gggccaactg cacagatcaa cctgaactac    900
aaccttacat ggattttttcc ggttgatgca ggtttcttt acctcctaag gttccatttc    960
tgtgagatta agtatcctat taccaaggtg aatcagaggt cattcttcat ctacatcaac   1020
aaccagacaa cgcagaagca aatggatgtc atcgtccgga gcggaggaat cggtagacca   1080
acgtacactg aaatatgttat catggctatt ggttctcgtc aggtggacat gtggattgca   1140
cttcaccctg atctttcaag taaaccacag tattcggatg caattctgaa tggtctcgag   1200
gtcttcaagc tacagaatta cggaccgagt aatcttgctg ggctcagtcc tccacttccg   1260
caaaagcctg atgtgaatcc tactaggcta tctaatggtg aaagaaaatc aaaggtggc    1320
atacaagcaa tcatcggtgg tactactggt ggttttgctt tattgttgat tgccctttttc   1380
agcatgtgtg ttatatacag acggaagaag gtagcgaaga gtcccggcaa gaccgactat   1440
ggacatgtga agcatccaac taaatgcata aagtctacat gtgatcttgt acgtcatttc   1500
tcatttgcta aaattcaagt tgccaccaaa gactttgatg aagcacttat tatccggaga   1560
ggcggtttcg ggaatgtcta catccggcgat atagatggag ggacaaaggt ggcaatcaag   1620
cgatgtgacc agaaatccca acaaggcttt catgagttcc agactgaaat cgagatgctg   1680
tgcaatttcc gccatcgcca cctttgtgtct ctgattggct attgtgagga gaagaatgag   1740
atgattctgg tgtatgacta catggctcat ggaacactgc gtgagcatct gtacaacacc   1800
aggaacccac cactaccgtg gcagcagcgc cttgagattt gcatcggtgc agcccaagga   1860
ctgcattacc tccacaccgg cgtagagcaa ggaatcatcc accgtgacgt caagaccacc   1920
aacatcctac tggatgatag gttaatggca aaggtttcac cttcggtct gtctaaggct   1980
agtccagaca ttggaaacac ccacatgagc actgctgtga agggcacctt tggatatctt   2040
gatccggagt acttccggct gcagcgtctc accaaaaaat cagatgtgta ctctttcggg   2100
gtcgtgttgt ttgagaccct gtgtgcgcgc cctgtgataa acactgagct cccttatgag   2160
caagtgagct tgcgtgactg ggcgctatct tgctggaaga acggtgtact tgaggagatt   2220
gttgaccccc gtgttaagga ggaaatcacc cctgagtgct tcagggtttt tgcagagata   2280
gcagagaaat gtgtagctga tcgtagcata gagaggccat caatgggtga tgtactttgg   2340
aaccttgagg tcgcactcca gctgcagcag gctagtgcaa gctacaacag caaccgtgca   2400
gagggtgctt catctcttca gatcagcgcg gtgcattcag acgaaccatc caccaactca   2460
acaattagca tcgcagcaca ggaagccata ttttcagata ttgcacatcc agaaggccga   2520
taa                                                                 2523

SEQ ID NO: 3              moltype = DNA   length = 20
FEATURE                   Location/Qualifiers
source                    1..20
                          mol_type = other DNA
                          note = fragment of TaMLR1 gene in Fielder
                          organism = synthetic construct
SEQUENCE: 3
gagcggagga atcggtagac                                                20

SEQ ID NO: 4              moltype = DNA   length = 52
FEATURE                   Location/Qualifiers
source                    1..52
                          mol_type = other DNA
                          note = fragment of TaMLR1 gene in TaFER-NKO
                          organism = synthetic construct
SEQUENCE: 4
caaatggatg tcatcgtccg gagtcggagg aatcggtaga ccaacgtaca ct            52

SEQ ID NO: 5              moltype = DNA   length = 21
FEATURE                   Location/Qualifiers
source                    1..21
                          mol_type = other DNA
                          note = Primer TaMLR1-cDNA-F
                          organism = synthetic construct
SEQUENCE: 5
atggtgctcc caaccttacc g                                              21

SEQ ID NO: 6              moltype = DNA   length = 23
FEATURE                   Location/Qualifiers
source                    1..23
                          mol_type = other DNA
                          note = Primer TaMLR1-cDNA-R
                          organism = synthetic construct
SEQUENCE: 6
aaatgtatgt ctacctttca ctc                                            23

SEQ ID NO: 7              moltype = DNA   length = 24
FEATURE                   Location/Qualifiers
source                    1..24
                          mol_type = other DNA
                          note = Primer TaMLR1-Target1-F
                          organism = synthetic construct
SEQUENCE: 7
actcgagcgg aggaatcggt agac                                           24

SEQ ID NO: 8              moltype = DNA   length = 24
```

-continued

```
FEATURE                 Location/Qualifiers
source                  1..24
                        mol_type = other DNA
                        note = Primer TaMLR1-Target1-R
                        organism = synthetic construct
SEQUENCE: 8
aaacgtctac cgattcctcc gctc                                              24

SEQ ID NO: 9            moltype = DNA  length = 24
FEATURE                 Location/Qualifiers
source                  1..24
                        mol_type = other DNA
                        note = Primer TaMLR1-Target2-F
                        organism = synthetic construct
SEQUENCE: 9
actcgtatac gaatttatgc cccg                                              24

SEQ ID NO: 10           moltype = DNA  length = 24
FEATURE                 Location/Qualifiers
source                  1..24
                        mol_type = other DNA
                        note = Primer TaMLR1-Target2-R
                        organism = synthetic construct
SEQUENCE: 10
aaaccggggc ataaattcgt atac                                              24

SEQ ID NO: 11           moltype = DNA  length = 24
FEATURE                 Location/Qualifiers
source                  1..24
                        mol_type = other DNA
                        note = Primer Blp-F
                        organism = synthetic construct
SEQUENCE: 11
gcaagaccct tcctctatat aagg                                              24

SEQ ID NO: 12           moltype = DNA  length = 25
FEATURE                 Location/Qualifiers
source                  1..25
                        mol_type = other DNA
                        note = Primer Blp-R
                        organism = synthetic construct
SEQUENCE: 12
tcagatctcg gtgacgggca ggacc                                             25
```